US012752387B2

(12) United States Patent
Toniolo

(10) Patent No.: US 12,752,387 B2
(45) Date of Patent: Oct. 6, 2026

(54) NUMERIC CONTROL MACHINE TOOL

(71) Applicant: PROQUADRO S.R.L., Pordenone (IT)

(72) Inventor: Carlo Toniolo, Pordenone (IT)

(73) Assignee: TECNO LOGICA S.R.L., Spresiano (IT)

( * ) Notice: Subject to any disclaimer, the term of this patent is extended or adjusted under 35 U.S.C. 154(b) by 454 days.

(21) Appl. No.: 17/916,609

(22) PCT Filed: Apr. 5, 2021

(86) PCT No.: PCT/IB2021/052805
§ 371 (c)(1),
(2) Date: Oct. 3, 2022

(87) PCT Pub. No.: WO2021/205318
PCT Pub. Date: Oct. 14, 2021

(65) Prior Publication Data
US 2023/0074070 A1 Mar. 9, 2023

(30) Foreign Application Priority Data
Apr. 7, 2020 (IT) ........................ 102020000007432

(51) Int. Cl.
*B23Q 15/12* (2006.01)

(52) U.S. Cl.
CPC .................................... *B23Q 15/12* (2013.01)

(58) Field of Classification Search
None
See application file for complete search history.

(56) References Cited

U.S. PATENT DOCUMENTS 10,651,440 B1 * 5/2020 Khan .................. H01M 50/249
2008/0078597 A1 * 4/2008 Voigt ...................... B60R 16/04 180/68.5
2011/0024264 A1 * 2/2011 Tokunaga ................ B23Q 7/02 198/478.1
2011/0295408 A1 * 12/2011 Burgel ................. G05B 19/401 700/192
2017/0017226 A1 * 1/2017 Yamazaki .......... B23Q 17/2471
2018/0308014 A1 10/2018 White et al.

FOREIGN PATENT DOCUMENTS

DE 3613096 A1 10/1987
DE 112012003796 T5 5/2014
DE 102016008284 A1 1/2017
EP 3326749 A1 5/2018

* cited by examiner

*Primary Examiner* — Ryan A Jarrett
(74) *Attorney, Agent, or Firm* — Rivka Friedman

(57) ABSTRACT

A method is described of machining a workpiece which is clamped in a fixturing element and is processed by a tool movably mounted on a CNC machine tool.

The fixturing element is integrally constrained to a frame of the CNC machine tool, then an optical scan of a geometry present in a portion of the workpiece is carried out. From digital data obtained during the optical scan, a coordinate of the geometry is determined in a reference system integral with the frame; and digital data, in particular coordinates, relating to a predetermined sequence of machining operations are processed to generate machining coordinates in the reference system integral with the frame for an actuator of the tool, said machining coordinates being such that the tool applies the pre-established sequence of machining operations on the workpiece at said coordinate.

16 Claims, 4 Drawing Sheets

NUMERIC CONTROL MACHINE TOOL

The present invention relates to a numeric control machine tool.

In CNC machine tools, it is known to perform a mechanical probing on the workpiece to detect points to be machined with a tool.

Probing is a time-consuming operation that must be performed on each workpiece. If the workpiece is moved to another machine or machining center, the precision acquired with the previous probing is lost.

When having to finish on the workpiece a previous rough machining, aggravated by a very big tolerance, the probing imposes to "touch" all the areas to be finished to instruct the machine on their position, increasing a lot the cycle time. That is to say that adapting each time the machining to a geometry known with low precision requires a long sequence of adjustments in the machine, up to a very long manual intervention to program the machining coordinates on each workpiece.

The main object of the invention is to improve upon the present state of the art.

A further object of the invention is realizing an improved machine tool capable of mitigating the aforementioned problem.

These and other objects are achieved by what is set forth in the appended claims; advantageous technical features are defined in the dependent claims.

A method is proposed for machining a workpiece that is clamped in a fixturing member and is machined by a tool movably mounted on a numeric control machine tool, wherein A. the fixturing member is fixed to a frame of the numeric control machine,
B. an optical scan is made of a geometry present in a portion of the workpiece,
C. from digital data obtained during the optical scan, a coordinate of the geometry is determined in a reference system integral with the frame,
D. digital data, in particular coordinates, relating to a predetermined sequence of machining operations are processed to generate machining coordinates in the reference system integral with the frame for an actuator of the tool, said machining coordinates being such that the tool applies the predetermined sequence of machining operations on the workpiece at said coordinate, for example by taking said coordinate or the origin of the reference system integral with the frame as the reference origin.

The method has the advantage that workpiece tolerances and fixturing tolerances are corrected, regardless of their magnitude. In other words, the machining on the workpiece occurs taking these tolerances into account, because they are measured during the optical scan. The step of determining coordinates of the geometry in a reference system integral with the frame, which coincides with the reference system of the tool actuator, ensures that the machining by the tool is executed at points that are not affected by the tolerances. Once the coordinate of the geometry to be machined has been established, the workpiece is machined relative to this coordinate or to the origin of the reference system integral with the frame.

In step B the optical scanning is preferably done by means of a digital camera or a laser beam.

Preferably in step C the digital data generated by the sensor are processed to

- recognize a geometric pattern, e.g. corresponding to a rough machining, and from the geometric pattern said coordinate is derived; and/or
- recognize image parts and assign said coordinate to said parts.

Preferably in step B the optical scanning is performed on an edge of the workpiece, more preferably on two opposite edges of the workpiece, in particular to determine the position of cavities to be finished with the tool. Even more preferably, the two opposite edges of the workpiece are scanned simultaneously.

Preferably the machined workpiece is a platform or flatbed, in particular an extruded aluminium alloy profile and/or a die-cast aluminium alloy profile or the combination of the two, i.e. materials subject to deformation and wide manufacturing tolerances. These platforms or flatbeds may receive any type of BEV, PHEV or internal combustion engine powertrain.

In a variant the machined workpiece is a battery-carrying tray for an electric vehicle, even more particularly made of extruded aluminium (a material very prone to deformation and manufacturing errors).

Preferably, the step C and/or D is performed via software, by programming an electronic processor or DSP.

Preferably, step B is performed by moving the same tool actuator that will perform the machining on the workpiece in step D.

In particular, the aforesaid method is applicable to a numeric control machine tool comprising a workpiece-carrying table rotatable about a—in use—vertical axis and N machining stations (e.g. machining by means of a tool), N≥2, arranged around the table, with the steps of

- rotating the table to bring a workpiece in front of a station,
- disconnecting the workpiece from the table,
- transferring the workpiece from the table to the station,
- fixing the workpiece to the station and machining the workpiece at the station by performing steps A to D;
- disconnecting the workpiece from the station,
- transferring the workpiece from the station to the table,
- fixing the workpiece to the table,
- rotating the table to bring the workpiece in front of a different station or unloading the workpiece from the table.

By means of the above mentioned steps the workpiece (or the workpiece support, see below) is alternatively made integral either only with the table or only with one station, with the great advantage that the vibrations generated by the machining at a station remain much more confined in the station itself. This applies to each workpiece that is delivered to a station of the sequence of stations, so that for each station and each workpiece being machined the above advantage applies simultaneously.

Another aspect of the invention relates to a numeric control machine tool comprising:

- a frame, to which a fixturing member, on which a workpiece to be machined by a tool (or a plurality of tools) is fixed, is anchored,
- an actuator to actuate the tool and move it relative to the frame to machine the workpiece in space,
- a sensor to perform an optical scan of a geometry present in a portion of the workpiece,
- an electronic processor configured to
  - read digital data generated by the sensor during the optical scan and from them determine a coordinate of the geometry in a reference system integral with the frame, generate digital machining data, in particular coordinates, with which to control the actuator during the workpiece machining, wherein the digital machining data are adapted to command and execute a predetermined sequence of machining operations which is calculated in the reference system integral with the frame at said coordinate, for example by taking said coordinate or the origin of the reference system integral with the frame as the reference origin.

For the optical scan preferably the machine comprises a digital camera or a laser beam.

Further advantages will become clear from the following description, which relates to an example of a preferred embodiment of machine tool in which.

Equal numbers in the figures indicate equal or substantially equal parts. To avoid crowding the drawings, sometimes equal elements are not numbered.

Figure 1:
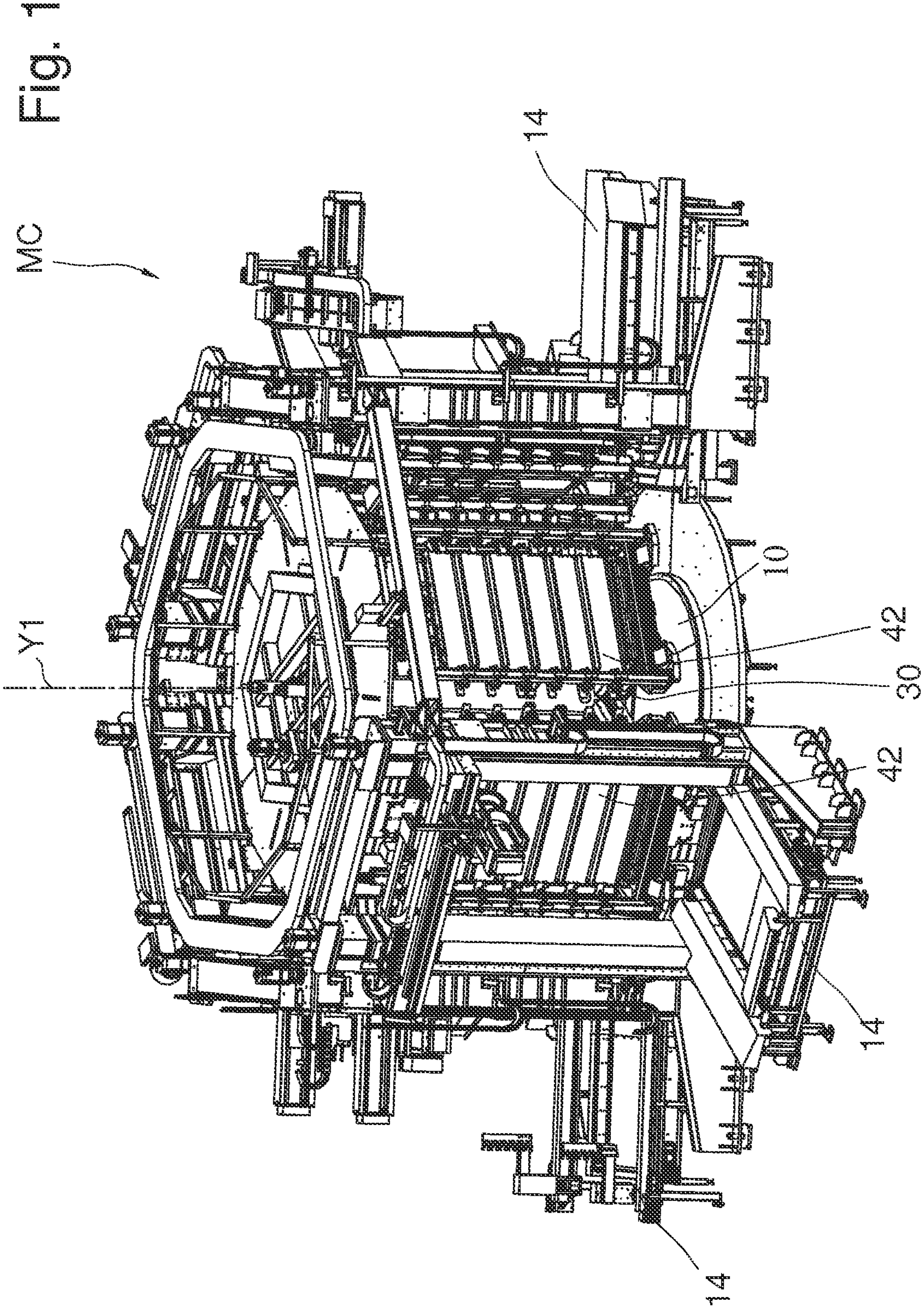
FIG. 1 shows a three-dimensional view of a machine.

FIG. 1 shows a numeric control machine tool MC comprising a central table 10 rotatable about a—in use—vertical axis Y1, and a plurality of machining stations 14 with tools, in the example five, arranged around the table 10. By rotating the table 10 about the axis Y1, a workpiece can be moved sequentially from a robot-assisted loading position through the stations 14 to be machined therein.

The table 10 is composed of a central drum from which, with radial symmetry, radial guides, which slidingly support a flat support 30 for a workpiece 42, extend radially towards each of the stations 14. By means of the radial guides, the support 30 can be radially moved away from, or moved closer to, the axis Y1, while by means of the rotation of the table 10, the support 30 can be rotated in front of one of the stations 14. A workpiece 42 can be mounted individually on the support 30, or preferably on one or each of the supports 30 there is loaded the assembly of a fixturing unit comprising blocking members, for example pneumatic grippers, magnets, or suction cups capable of holding the workpiece 42 on themselves and/or bringing it to zero references in the case of a flexible workpiece. In the following, by "workpiece" we will generically refer to a case or the other.

A or each support 30 can be integrally connected to the table 10 or a station 14, e.g. via a quick-release connection. For this purpose, a or each support 30 comprises means for anchoring/connecting to the table 10 and to the station 14 that can be activated/deactivated depending on the state of a control input.

Figure 3:
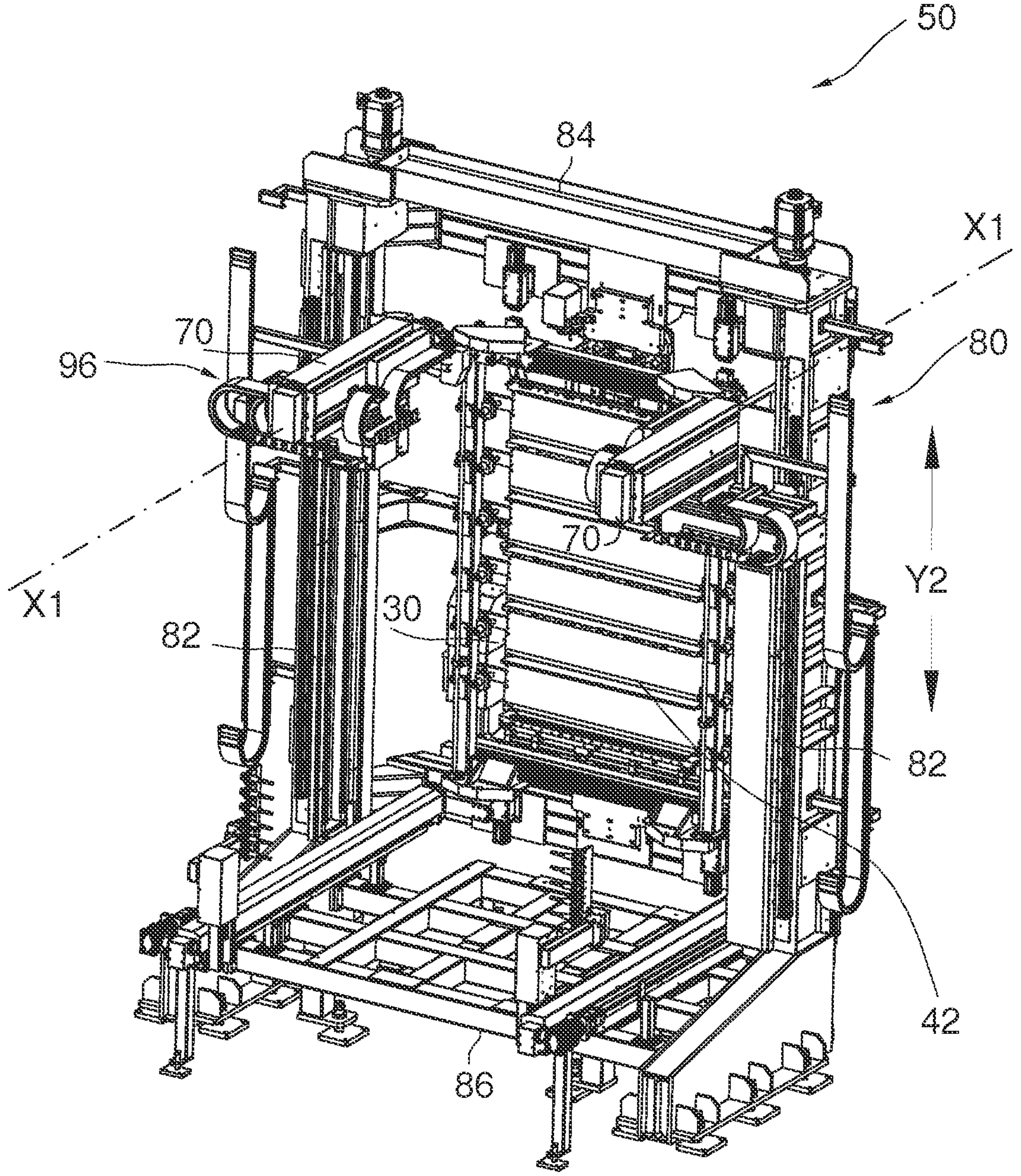
FIG. 3 shows a three-dimensional view of a machining station of the machine tool.

An operating method for machining a workpiece 42 with the machine MC tool (see also sequence in FIG. 1) comprises the steps of mounting the workpiece 42 on a support 30 onboard the table 10 (FIG. 1*a*);

blocking the support 30 on the table 10 by operating the anchoring means on the support 30 (optional), see FIG. 1*b;* retracting the support 30 towards the Y1 axis along the guide; this step is optional but advantageous because it makes it easier to load the workpiece 42 onto a support 30 that is more protruding from the table 10, rotating (FIG. 5) the table 10 to bring the support 30 with the workpiece 42 in front of the tools of a station 14 (FIGS. 3 and 4); in the illustrated example the rotation angle is 360 degrees/6 stations=60 degrees;

disconnecting the support 30 from the table 10 by deactivating the anchoring means between the table 10 and the support 30;

translating (FIG. 1*d*) the support 30 along the guide moving it radially away from the axis Y1 to bring the support 30 closer to the station 14;

integrally connecting the support 30 to the station 14 by activating anchoring means between the support 30 and the station 14;

machining the workpiece 42 by the tool of the station 14;

disconnecting the support 30 from the station 14 by deactivating the anchoring means;

translating the support 30 along the guide radially moving it closer to the axis Y1 to transfer the support 30 on the table 10 (FIG. 1*e*);

connecting the support 30 to the table 10 by activating the anchoring means between the table 10 and the support 30;

rotating (FIG. 1*f*) the table 10 to bring the support 30 with the workpiece 42 in front of the tools of the next station 14 or unloading the workpiece 42 from the table 10 if it has already visited all the stations 14 by making a complete turn with the table 10.

Figure 2:
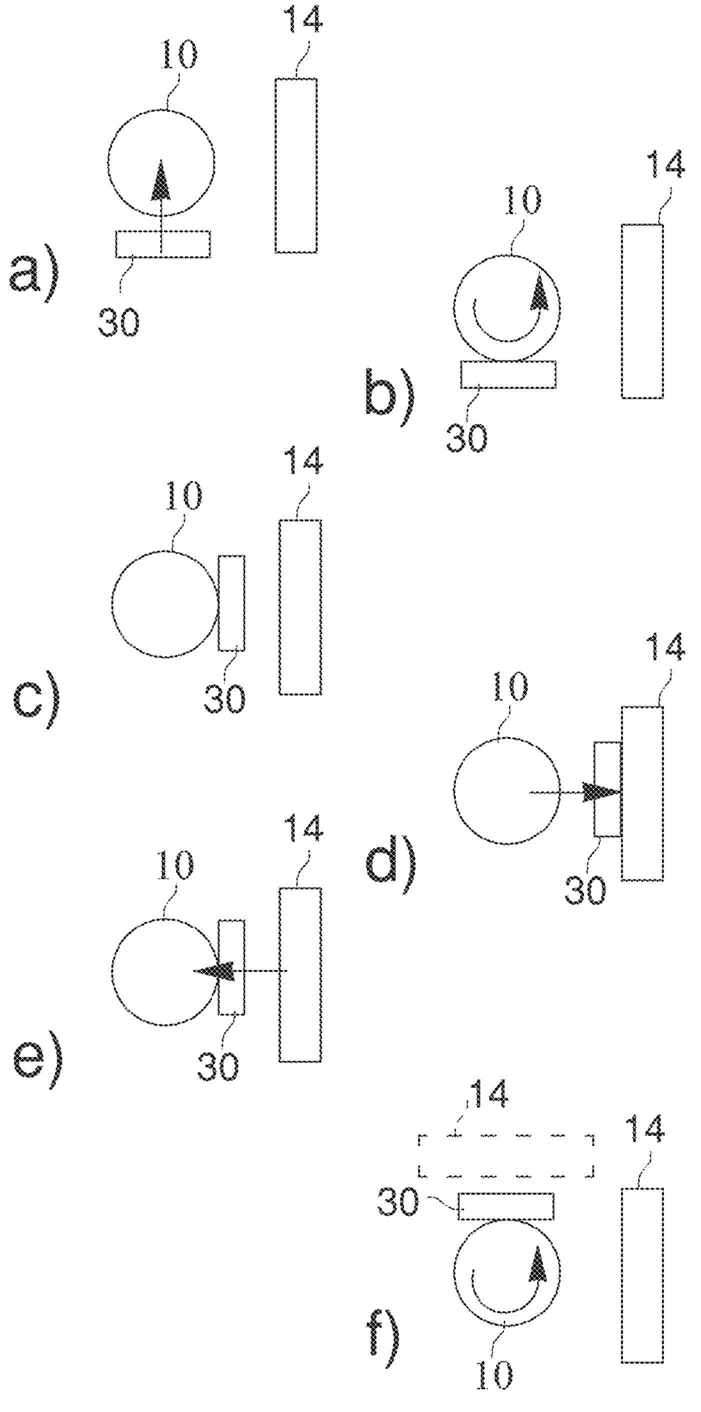
FIG. 2 shows a schematic sequence of the processing of the machine tool.
Figure 4:
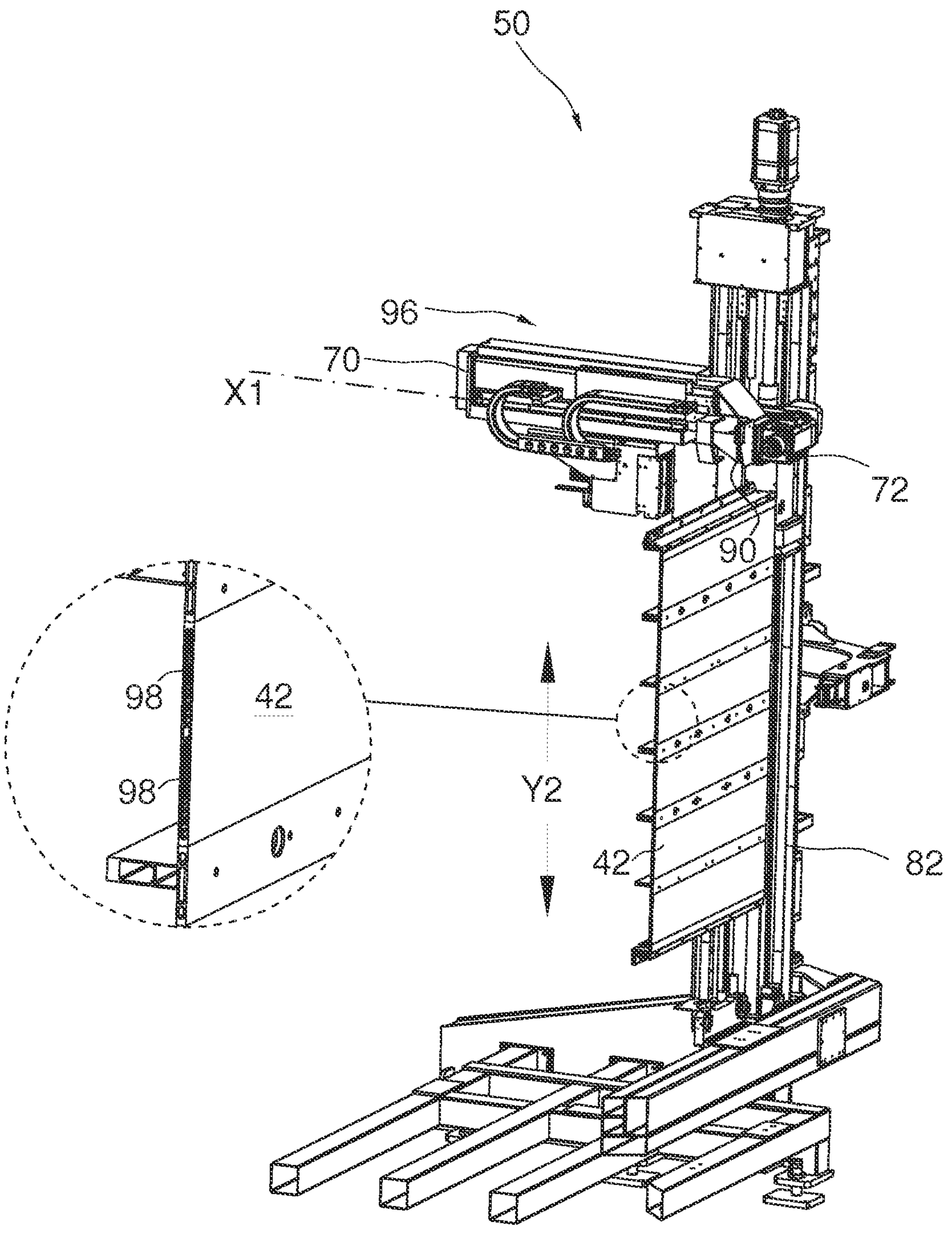
FIG. 4 shows a three-dimensional view of a detail of FIG. 3.

A preferred structure for at least one of the stations 14 is illustrated in FIGS. 2 and 4, and indicated by 50. The station 50 comprises a cornice or frame or framework 80 composed of two vertical uprights 82 joined by a lower cross-member 86 and an upper cross-member 84. The vertical uprights 82 with the lower cross-member 86 and upper cross-member 84 form a rectangular or square frame.

Movably mounted on the frame or framework 80 is a machining device or actuator 96 with a tool 72 for machining the workpiece 42. The device 96 is movable on the uprights 82 along a vertical axis Y2, parallel to the axis Y1, by means of a known motor drive. The device 96 comprises two spindles 70, one per upright 82, each driving a tool 72, e.g. a milling cutter, which is facing the center of the station 50.

Each tool 72 is mounted linearly translatable on or with the spindle 70, so that each tool 72 is also controllably movable along a horizontal axis X1, orthogonal to the plane containing the uprights 82. Each spindle 70 is movable along a respective horizontal axis X1, wherein the two axes X1 are parallel to each other and lie in the same horizontal plane (orthogonal to the axis Y1).

The tools 72 have aligned rotation axes, orthogonal to the axis X1, and are facing each other, so that the device 96 is able to simultaneously machine with the tools 72 the two opposite edges of a workpiece 42, in the example an aluminum flatbed (see FIG. 4).

Near each tool 72 there is a laser source 90, preferably covered by a self-propelled casing. The source 90 is positioned so as to direct a laser beam towards the centre of the station 50, along a direction parallel to the rotation axis of each respective tool 72. Therefore, the device 96 is able to simultaneously strike the two opposite edges of the workpiece 42 with a laser beam.

The operation of station 50 is as follows.

As shown in FIG. 1, a workpiece 42, which is clamped into a fixturing member, arrives on the station 50, and the fixturing member becomes constrained integrally with the frame of the station 50.

The opposite edges of the workpiece 42 are to be machined by the tools 72, in particular to finish and/or process a rough geometry. Before the workpiece 42 is machined by the tools 72, an optical scan of the geometry (e.g. cavities, holes or curvatures) present on the opposite edges of the workpiece 42 is performed. For this purpose, by means of a movement of the device 96, the source 90 of each spindle 70 is brought into alignment with the nearest edge of the workpiece 42. Then the source 90 is activated and by means of a displacement of the device 96 along the axis Y2, the entire length of the edges of the workpiece 42 is scanned. The scan generates digital data which is processed via software to determine a coordinate of the scanned geometry in a reference system integral with the frame.

Then, a predetermined sequence of machining operations is applied to the edge of the workpiece 42, in correspondence of the detected geometry. Then the digital data of the scan are processed to generate machining coordinates for the spindles 70 in the reference system integral with the station 50. The machining coordinates are calculated such that the tool 72 applies to the workpiece 42 the predetermined sequence of machining operations in correspondence of a said coordinate detected by the scan, e.g. by taking said coordinate or the origin of the reference system integral with the station as the reference origin.

For example, if for the tool 72 a machining process along a circle is programmed, to apply this machining at a precise point of the edge of the workpiece 42 it is sufficient, for example, to bring the tool to the scanned point on the edge where the center of the circle is desired, and from there to perform the circular machining relative to the center.

Since the digital data, in particular coordinates, are related to a reference system integral with the frame, the machine now knows precisely the position of the parts to be machined with respect to a reference system of its own, with the advantage that any tolerance of the part and/or the fixturing can be corrected or taken into account.

Another advantage is the integral arrangement of the tool 72 and the source 90, which ensures the identity of the handling and positional detection systems during the scanning and machining steps.

The method has the advantage that the specific tolerances or defects of a workpiece and the fixturing tolerances are corrected, regardless of their magnitude. If, for example, there is a row of cavities to be machined along the edge of the workpiece 42 (FIG. 4) and, for production reasons, such row is not perfectly aligned, the method still allows the cavities to be machined precisely because, thanks to the scanning, the machining process adapts each time to the actual position of the cavities.

Particular efficiency has been experienced when the workpiece 42 is an automobile component, e.g. a flatbed for housing electric car batteries; and/or the workpiece 42 is made of aluminum.

Although the optical scanning has been described with reference to the multi-station machine MC, the station 50 may be exploited in a single-station machine.

A video-camera or an image sensor may also be used as a source 90.

The invention claimed is:

1. Method of machining a workpiece which is clamped in a fixturing element and is processed by a tool movably mounted on a CNC machine tool, wherein A. the fixturing element is integrally constrained to a frame of the CNC machine tool, B. an optical scan of a geometry present in a portion of the workpiece is carried out, C. from digital data obtained during the optical scan, a coordinate of the geometry is determined in a reference system integral with the frame, D. digital coordinates, relating to a predetermined sequence of machining operations, are processed to generate new machining coordinates in the reference system integral with the frame for an actuator of the tool, said new machining coordinates being a whole new tool path calculated before step E such that the tool applies the predetermined sequence of machining operations on the workpiece at said coordinate generating a predetermined sequence of new machining operations, E. applying the predetermined sequence of new machining operations on the workpiece at said coordinate by the tool according to said generated new machining coordinates to carry out the whole new tool path.

2. Method according to claim 1, wherein in step B the optical scan takes place by means of a digital camera or a laser beam.

3. Method according to claim 2, wherein in step C the digital data are processed for recognizing a geometric pattern, and from the geometric pattern said coordinate is obtained; and/or recognizing image parts and assigning said coordinate to said parts.

4. Method according to claim 2, wherein in step C the digital data are processed for recognizing a geometric pattern corresponding to a rough finishing, and from the geometric pattern said coordinate is obtained; and/or recognizing image parts and assigning said coordinate to said parts.

5. Method according to claim 1, wherein in step C the digital data are processed for recognizing a geometric pattern and from the geometric pattern said coordinate is obtained; and/or recognizing image parts and assigning said coordinate to said parts.

6. Method according to claim 1, wherein in step B the optical scan is performed on an edge of the workpiece, or on two opposite edges of the workpiece, to determine the position of cavities to be finished with the tool.

7. Method according to claim 1, wherein the processed workpiece is a platform or flatbed.

8. Method according to claim 1, wherein step B occurs by moving the same tool actuator that in step B will perform the machining on the workpiece.

9. Method according to claim 1, wherein the method is applied to a CNC tool machine comprising a workpiece-carrying table rotatable about an—in use—vertical axis and N machining stations, N≥2, arranged around the table, with the steps of rotating the table to bring a workpiece to be machined in front of a station, disconnecting the workpiece from the table, transferring the workpiece from the table to the station, fixing the workpiece to the station and machining the workpiece at the station by performing said steps A to D;

disconnecting the workpiece from the station, transferring the workpiece from the station to the table, fixing the workpiece to the table, rotating the table to bring the workpiece in front of a different station or unloading the workpiece from the table.

10. Method according to claim 1, wherein the machined workpiece is a battery-carrying tray for an electric vehicle.

11. Method according to claim 1, wherein in step C the digital data are processed for recognizing a geometric pattern, corresponding to a rough finishing, and from the geometric pattern said coordinate is obtained; and/or recognizing image parts and assigning said coordinate to said parts.

12. Method according to claim 1, wherein the processed workpiece is an extruded profile made of aluminum alloy and/or a die-cast profile made of aluminum alloy.

13. CNC machine tool comprising:

a frame to which a fixturing member, on which a workpiece is fixed to be machined by a tool, can be anchored, an actuator to operate the tool and move it relative to the frame to machine the workpiece in space, a sensor for performing an optical scan of a geometry present in a portion of the workpiece, an electronic processor configured for reading digital data generated by the sensor during the optical scan and determining from them a coordinate of the geometry in a frame of reference integral with the machine's frame, generating, by processing digital coordinates relating to a predetermined sequence of machining operations, new machining coordinates in the reference system integral with the frame for an actuator of the tool, said new machining coordinates being a whole new tool path, with which to control the actuator during the workpiece processing, wherein the digital data are adapted to command and execute a predetermined sequence of new machining operations which is calculated in the frame of reference integral with the machine's frame at said coordinate to carry out the whole new tool path.

14. Machine tool according to claim 13, wherein the electronic processor is configured so that said digital data generated by the sensor are processed to recognize a geometric pattern and from the geometric pattern said coordinate is obtained.

15. Machine tool according to claim 13, wherein the electronic processor is configured so that said digital data generated by the sensor are processed to recognize image parts and assign said coordinates to said parts.

16. Machine tool according to claim 13, wherein the electronic processor is configured so that said digital data generated by the sensor are processed to recognize a geometric pattern, corresponding to a rough finishing, and from the geometric pattern said coordinate is obtained.

* * * * *